No. 825,416. PATENTED JULY 10, 1906.
P. F. RICE.
FLEXIBLE SPEED POWER TRANSMITTING DEVICE.
APPLICATION FILED APR. 10, 1905.

Witnesses:
Frank L. Graham
George T. Hackley

Inventor:
Percy F. Rice.
by Townsend Bros
his Attys.

UNITED STATES PATENT OFFICE.

PERCY F. RICE, OF TUSTIN, CALIFORNIA.

FLEXIBLE-SPEED POWER-TRANSMITTING DEVICE.

No. 825,416.  Specification of Letters Patent.  Patented July 10, 1906.

Application filed April 10, 1905. Serial No. 254,737.

*To all whom it may concern:*

Be it known that I, PERCY F. RICE, a citizen of the United States, residing at Tustin, in the county of Orange and State of California, have invented a new and useful Flexible-Speed Power-Transmitting Device, of which the following is a specification.

This invention relates to a device for coupling together two rotating or oscillatory elements so that both of said elements revolve or oscillate in unison or for allowing one of said elements to revolve or oscillate freely without revolving or oscillating the other element or for driving one element from the other, so that the elements move at different speeds, the ratio of speed between the two elements having a range from minimum to maximum with any given speed of the driving element, it being possible to produce an infinite number of speeds of the driven element with respect to any given speed of the driving element ranging from the stationary point of the driven element to maximum speed of the driven element when it works in unison with the driving element; and the main object of the invention is to provide a device of the character described for accomplishing these functions without the use of rotating gears and attendant clutches and to employ positively-operating mechanism which is simple in construction, of great strength and durability, and which affords extreme flexibility, giving all possible speed ratios within the limits, and which is susceptible of the finest adjustment or regulation for securing various speeds and which when acting as a clutch with both rotating elements operating in unison as a single element produces absolutely no friction and operates positively, and which when adjusted to allow the driven element to remain stationary will permit the driving element to operate with the greatest freedom.

Another object is to provide a device of the character described which may be constructed at a very low cost, another object being to provide for readily taking up or compensating for wear of the parts.

Other objects and advantages will appear in the following description.

The accompanying drawings illustrate the invention, and referring thereto—

Figure 1:
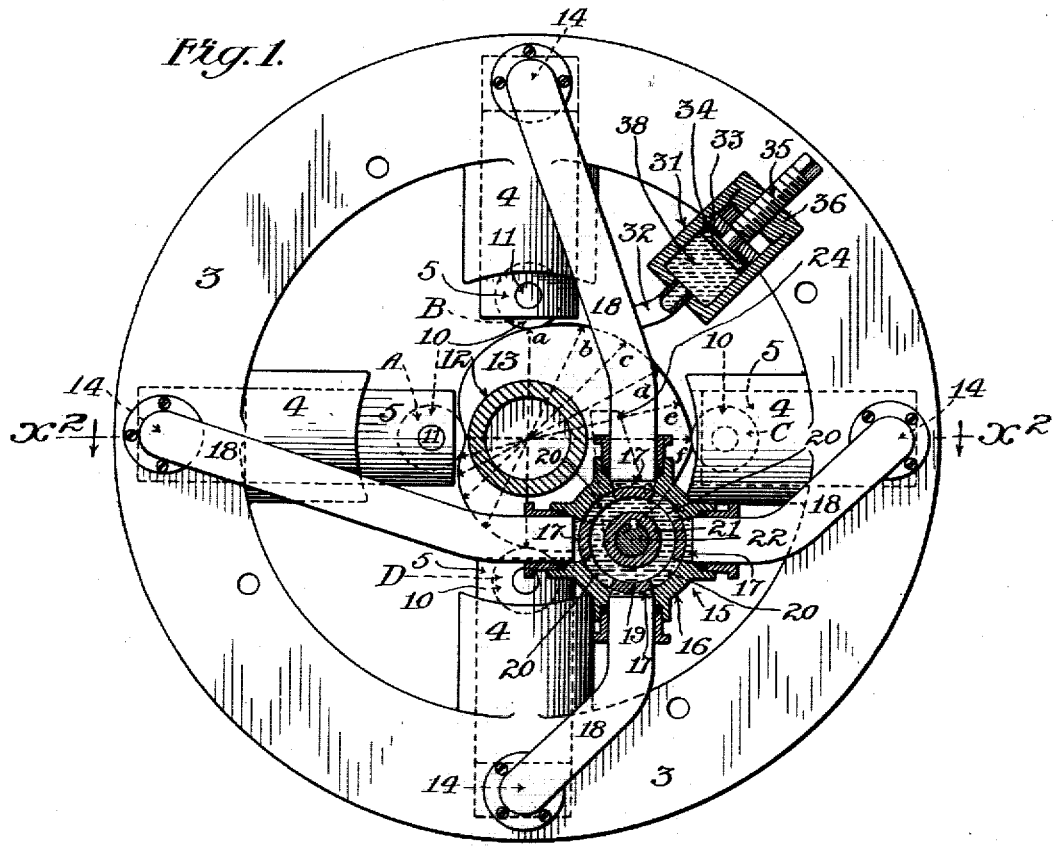
Figure 2:
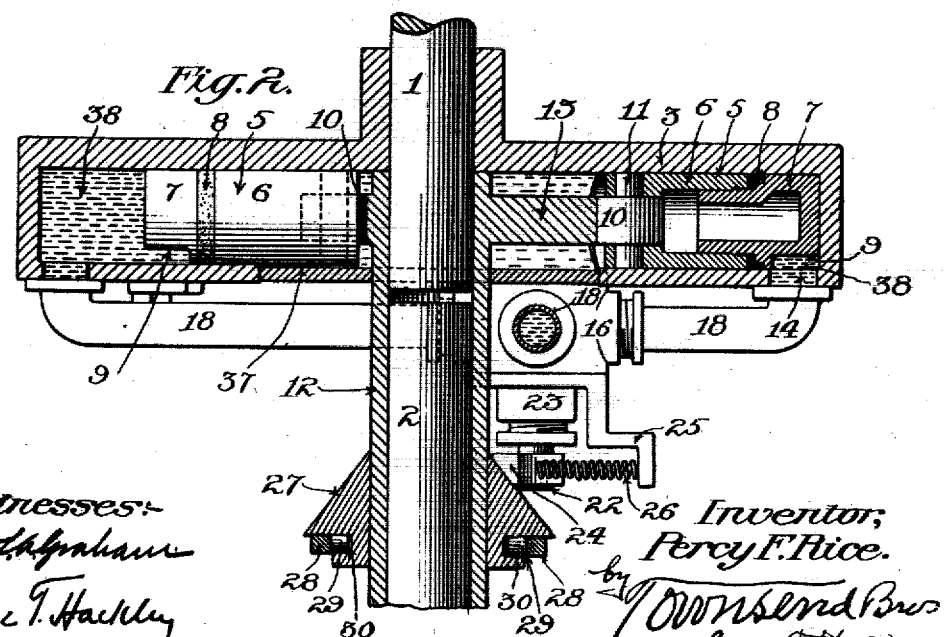

Figure 1 is a side elevation of the device, the controlling-valve being shown in transverse section, together with the sleeve of the driven element. Fig. 2 is a section on line $X^2 X^2$, Fig. 1.

The driving element in the present embodiment comprises a shaft 1, while the driven element comprises a shaft 2, arranged in line with the shaft 1. Rigidly mounted on the shaft 1 is a fly-wheel 3, which has four radially-arranged cylinders 4, cast, preferably, integral with the rim thereof and projecting inwardly. Arranged within each cylinder 4 is a piston 5, comprising a guiding member 6 and a head 7, the latter being screwed to the guiding member with a cup-shaped packing 8, arranged between the two members 6 and 7. The two members of the piston are preferably hollow in order to minimize weight, and the member 7 is cut away on one side to form a recess. The guiding member 6 carries a roller 10, the axis of which lies parallel with the shaft 1.

Rigidly fastened to the driven shaft 2 is a sleeve 12, which carries a cam 13, the contour of which is substantially heart-shaped and against the periphery of which the four rollers 10 bear. The contour of the cam 13 is such that the lengths of the dotted lines *a b c d e f*, which pass through the axis upon which the cam 13 revolves, are the same. Thus the distance between the opposite points of the cam against which the two members of either pair of opposite rollers 10 bear is always the same irrespective of the position of the cam. It is found that for this purpose a heart-shaped cam is required, the diametral distance between opposite faces or points of the cam being always the same, or, in other words, all diameters of the cam being equal or the cam being of equal diametral extension throughout, the diameters being taken as lines passing through the center of rotation of the cam and extending to the bearing-faces of the cam at each side.

Owing to the general eccentricity of the cam 13, a variant stroke is secured between the two pairs of rollers and pistons when the cam 13 moves relatively to the fly-wheel 3. Thus when, as shown in Fig. 1, the roller A stands closest to the axis of the cam 13 the roller C stands farthest away from the axis of the cam, while rollers B and D each stand at equal intermediate distances from the axis of the cam. Thus when the rollers B and D bear against the points of the cam intersected by the line f the said rollers will respectively stand closest and farthest from the axis of the cam, while at that time the rollers A C will respectively stand at intermediate distances from the center, and when the cam stands at any other position with respect to the rollers (although none of the rollers may stand in either extreme position with relation to the axis of the cam) a constant distance is always maintained between the rollers A C and between the rollers B D.

Each cylinder 4 is provided with a port 14, near the outer end. Carried by the fly-wheel 3 and arranged at one side of the axis thereof is a controlling-valve 15, comprising an outer casing 16, having four ports 17, each of which communicates, through a pipe 18, with the port 14 of a cylinder 4. Nested within the casing 16 is a revoluble shell 19, having four ports 20. The shell 19 is supported by a hollow stem or sleeve 21, which is keyed to a shaft 22, the shaft 22 extending through the casing 16 and through a suitable stuffing-box 23 and carrying on its end an arm 24 with an inclined face.

A bracket 25 is mounted on the casing 16, and between the bracket 25 and the arm 24 is a coil compression-spring 26, which resiliently presses the arm 24 against a conical sleeve 27, which is loosely mounted on the sleeve 12 and which may be shifted longitudinally along the sleeve 12 by a fork 28, having studs 29, which engage in a groove 30, formed in the sleeve 27, the fork 28 being operated by any suitable mechanism. (Not shown.)

Carried by the fly-wheel 3 is a small cylindrical reservoir 31, which is connected by a pipe 32 with one of the pipes 18. Within the cylinder 31 is a piston 33, having a cupped washer 34, and swiveled to the piston 33 is a screw 35, which is threaded through the head 36 of the cylinder 31. By turning the screw 35 the piston 33 may be advanced or retracted within the cylinder 31.

A plate 37, which is attached to the fly-wheel, incloses the cam 13 and protruding parts 6 of the piston 5, which are thus protected from injury and dust is excluded, and the inclosed parts run in oil, which affords the necessary lubrication.

The space within the cylinders 4 back of the pistons is filled with a non-compressible fluid, such as oil 38, which likewise fills all of the pipes 18 and the space within the valve 15, the cylinder 31 also containing an extra amount of fluid which is in direct communication with the fluid in the pipes 18.

It is obvious that when the valve 15 is set so that the ports 17 are entirely closed it is impossible for the oil to circulate therethrough from one cylinder to another and that therefore the pistons 7 will be locked against outward movement by the oil within the cylinders, and therefore as the fly-wheel 3 revolves it will cause the cam 13 to rotate in unison therewith, as the cam 13 is securely locked by the rollers 10.

By shifting the conical sleeve 27 along the sleeve 12 the arm 24 may be rocked, which will turn the shell 19 and open the ports 17, which will allow the oil to circulate through the valve and will cause the shaft 2 to rotate slower than the shaft 1, the rollers 10 as they ride over the cam 13 moving the pistons 5 back and forth and causing the oil to flow from one cylinder to another. Obviously if the cam 27 is moved in to throw the lever 24 clear over, so that the ports 17 are fully opened, the oil will be allowed to freely circulate through the valve, and thus as no opposition will then be afforded to the movement of the pistons the cam 13 and shaft 2 will remain stationary, although the fly-wheel and shaft 1 may be revolving at any speed.

By adjusting the sleeve 27 to partially close the ports 17 the rate of movement of the pistons will be restricted to the speed with which the oil can pass through the valve, and therefore if there is a load on the shaft 2 the cam 13 will be restrained to a speed at which it is permitted to move the rollers 10, with attached pistons, back and forth. It is apparent that the valve can be so regulated as to produce in this manner any desired ratio of speed between the driven shaft and driving-shaft.

As the oil in its circulation travels through the pipes 18, which are exposed and whirling rapidly through the air with the fly-wheel, the oil is cooled and prevented from overheating. While the oil cannot escape from its regular channels, the supply may be replenished if necessary by screwing in the screw 35, which is adjusted inwardly until the oil completely fills the space in the system of cylinders and piping. This device is also used in filling the system with oil, the cap 36 being removed and the oil poured into the cylinder or chamber 31 until the oil fills the entire system and part of said cylinder 31, the cap 36 and the adjusting devices 35 33 34 carried thereby being then inserted and the part 35 being then screwed in to adjust the volume of the chamber until the piston 33 34 has pressed the oil into tight contact with all parts of the confining-space. The shape of the cam 13 is an important feature, as the movement of the pistons must harmonize to maintain a constant capacity of oil-space, the operation of the pistons being alternate, complementary, and mutually compensating.

What I claim is—

1. A driving element, a driven element, cylinder and piston members connected to the respective elements, said cylinders being connected to form a confining-space for liquid, and means for causing relative operation of the cylinder and piston members to vary the capacity of certain parts of the confining-space but to maintain a constant capacity of the confining-space as a whole, a chamber in connection with said confining-space, and means for adjusting the capacity of said chamber.

2. A driving element, a driven element, a plurality of cylinders carried by one of said elements, connections between said cylinders to form a confining-space for liquid, pistons in said cylinders, means connected to the other of said elements, to cause alternate and complementary operation of said pistons to circulate the liquid from one cylinder to another, but to maintain a constant volume of liquid-confining space, a chamber communicating with said cylinders, and means for adjusting the capacity of said chamber.

3. A driving element, a driven element, a plurality of cylinders carried by one of said elements, connections between said cylinders to form a liquid-confining space, pistons in said cylinders, means connected to the other of said elements to cause alternate and complementary operation of said pistons to circulate the fluid from one cylinder to another, but to maintain a constant volume of the liquid-confining space, a chamber communicating with said cylinders, and means for adjusting the capacity of said chamber, comprising a screw device working in said chamber.

4. A driving element, a driven element, a plurality of cylinders carried by one of said elements, connections between said cylinders to form a liquid-confining space, pistons in said cylinders, a cam connected to the other of said elements to cause alternate and complementary operation of said pistons to circulate the fluid from one cylinder to another, but to maintain a constant volume of the liquid-confining space, a chamber communicating with said cylinders, and means for adjusting the capacity of said chamber, comprising a screw device working in said chamber.

5. A driving element, a driven element, a plurality of cylinders carried by one of said elements, connections between said cylinders to form a confining-space for liquid, pistons in said cylinders, means connected to the other of said elements to cause alternate and complementary operation of said pistons to circulate the liquid from one cylinder to another, but to maintain a constant volume of liquid-confining space, a chamber communicating with said cylinders, means for adjusting the capacity of said chamber, and adjustable valve means for restricting and controlling the circulation of said liquid.

6. A driving element, a driven element, cylinders carried by the driving element, means communicating with the cylinders for confining a liquid and allowing a circulation thereof, a cam carried by the driven element, said cam being heart-shaped and having all its diameters of equal length and a piston in each cylinder coöperating with the cam.

7. A driving element, a driven element, cylinders carried by the driving element, means communicating with the cylinders for confining a liquid and allowing a circulation thereof, said confining means comprising a cylinder, a piston working in said cylinder, and means for adjusting the position of said piston to reduce the confining-space in accordance with the volume of the liquid, a cam carried by the driven element, a piston in each cylinder coöperating with the cam, and means for regulating the rate of circulation of the liquid.

8. A driving element, a driven element, cylinders carried by the driving element, means communicating with the cylinders for confining a liquid and allowing a circulation thereof, a cam carried by the driven element, a piston in each cylinder coöperating with the cam, means for regulating the rate of circulation of the liquid, and means for replenishing the liquid comprising a chamber having a closable opening and piston means working in said chamber to adjust the volume of the space within the chamber.

9. A driving element, a driven element, cylinders carried by the driving element, means communicating with the cylinders for confining a liquid and allowing a circulation thereof, said means including a chamber and a member adjustable therein to vary the volume of the space within the chamber, said means being exposed, thereby cooling the liquid, a cam carried by the driven element, the diametral extension of the cam being equal throughout the cam and a piston in each cylinder coöperating with the cam.

10. A driving element, a driven element, cylinders carried by the driving element, a piston in each cylinder, a roller carried by each piston, a cam carried by the driven element and bearing against said rollers said cam being of substantially equal diametral extension throughout, and pipes placing the cylinders in communication.

11. A driving element, a driven element, cylinders carried by the driving element, a piston in each cylinder, a roller carried by each piston, a cam carried by the driven element and bearing against said rollers said cam being of substantially equal diametral extension throughout, pipes placing the cylinders in communication, and a valve for regulating the passage of liquid through the pipes.

12. A driving element, a driven element, cylinders carried by the driving element, a piston in each cylinder, a roller carried by each piston, a cam carried by the driven element and bearing against said rollers said cam being of substantially equal diametral extension throughout, pipes placing the cylinders in communication, a valve for regulating the passage of liquid through the pipes, a lever connected with the valve, and a conical sleeve on the driven element for operating said lever.

13. A driving element, a driven element, cylinders carried by the driving element, a piston in each cylinder, a roller carried by each piston, a cam carried by the driven element and bearing against said rollers said cam being of substantially equal diametral extension throughout, pipes placing the cylinders in communication, a valve for regulating the passage of liquid through the pipes, a lever connected with the valve, a conical sleeve on the driven element for operating said lever, a bracket carried by the driving element, and a spring between the bracket and said lever for resiliently holding the lever against the conical sleeve.

14. A driving element, a driven element, cylinders on one of said elements radially arranged diametrically opposite each other, a piston in each cylinder, and a cam carried by the other element and coöperating with the pistons, said cam being heart-shaped and of substantially equal diametral extension throughout.

15. A driving element, a driven element, cylinders on one of said elements radially arranged diametrically opposite each other, a piston in each cylinder, a cam carried by the other element and coöperating with the pistons, the contour of said cam being such that diametrically opposite pistons are always maintained a constant distance apart, irrespective of the position of the cam.

16. A driving element, a driven element, cylinders on one of said elements radially arranged diametrically opposite each other, a piston in each cylinder, a cam carried by the other element and coöperating with pistons, pipes connected with the cylinders, a valve connected with pipes for controlling the passage of liquid through the pipes, a supply-cylinder carried by the driving element and communicating with one of said pipes, a piston in the latter cylinder, and means for moving the latter piston.

17. A driving-shaft, a fly-wheel with a sleeve rigidly attached to said shaft, a driven shaft, a sleeve rigidly attached to the driven shaft, a cam on the latter sleeve, said cam being of equal diametrical extension throughout, cylinders formed integrally with the fly-wheel, a piston in each cylinder coöperating with the cam, pipes connected with the cylinders, a valve for controlling the passage of fluid through said pipes, a chamber connected to said pipes, and having a removable cap and a screw device in said chamber for adjusting the volume thereof.

In testimony whereof I have hereunto set my hand, at Los Angeles, California, this 4th day of April, 1905.

PERCY F. RICE.

In presence of—
GEORGE T. HACKLEY,
R. A. HEFFNER.